United States Patent
Zawacki et al.

(10) Patent No.: US 8,544,082 B2
(45) Date of Patent: Sep. 24, 2013

(54) SECURITY REUSE IN HYBRID INFORMATION HANDLING DEVICE ENVIRONMENTS

(75) Inventors: Jennifer Zawacki, Hillsborough, NC (US); Steven R. Perrin, Raleigh, NC (US); Scott E. Kelso, Cary, NC (US); James S. Rutledge, Durham, NC (US); Matthew P. Roper, Cary, NC (US); Jian Li, Chapel Hill, NC (US); Yi Zhou, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/343,851

(22) Filed: Jan. 5, 2012

(65) Prior Publication Data
US 2013/0179964 A1 Jul. 11, 2013

(51) Int. Cl.
G06F 12/00 (2006.01)
(52) U.S. Cl.
USPC ............................................. 726/16; 726/17

(58) Field of Classification Search
USPC .......................... 726/16–20, 26–27; 713/1, 2
See application file for complete search history.

(56) References Cited

U.S. PATENT DOCUMENTS

| 6,763,458 | B1 * | 7/2004 | Watanabe et al. ............. 713/100 |
| 7,500,090 | B2 * | 3/2009 | Mondshine et al. ............... 713/1 |
| 2007/0022421 | A1 * | 1/2007 | Lescouet et al. ................ 718/1 |

* cited by examiner

Primary Examiner — Hosuk Song
(74) Attorney, Agent, or Firm — Ference & Associates LLC

(57) ABSTRACT

Systems, methods and products directed toward providing security in hybrid information handling device environments are described herein. One aspect an information handling device comprising: one or more processors; and one or memories storing program instructions accessible by the one or more processors; wherein, responsive to execution of program instructions stored in the one or more memories, the one or more processors are configured to: ascertain a resume request for resuming to a secondary operating environment; and prior to resuming the information handling device to the secondary operating environment, initiate a primary operating environment security application. Other embodiments are described herein.

20 Claims, 5 Drawing Sheets

US 8,544,082 B2

SECURITY REUSE IN HYBRID INFORMATION HANDLING DEVICE ENVIRONMENTS

BACKGROUND

Information handling devices come in a variety of forms including for example laptop computers, slate/tablet computers, smart phones, and the like. Tablet computers and laptop computers are different on many levels. Tablet or slate computers are generally smaller and more lightweight than laptop computers, often consisting only of a single component. Tablet computers integrate the display with the typical lower base portion of a laptop/clamshell computer, usually lack a physical keyboard, and often utilize a touch screen as an input device.

In addition to structural differences, tablet and laptop computers also differ with respect to their internal software and hardware configurations. The typical laptop computer form factor houses a Win-Tel platform, comprised of an Intel x86 compatible processor and is capable of running a Microsoft WINDOWS operating system, such as WINDOWS 7 operating system. In comparison, tablet computers include a light weight platform and are most likely to run on lower powered processors and lighter weight operating systems specially designed for smaller devices. The lighter weight operating systems are often referred to as mobile operating systems, and are optimized for touch and content consumption instead of running large applications, such as the full version of the Microsoft WORD document processing application. A popular example of a mobile operating system is the ANDROID operating system, which has been used as the operating system for mobile devices such as smartphones, netbooks, and tablet computers. A prominent processor family for these smaller mobile devices, such as a tablet computer, is the ARM series of processors, such as the SNAPDRAGON BY QUALCOMM CPU. WINDOWS 7 is a registered trademark of Microsoft Corporation in the United States and/or other countries. ANDROID is a registered trademark of Google Incorporated in the United States and/or other countries. SNAPDRAGON BY QUALCOMM is a registered trademark of Qualcomm Incorporated in the United States and/or other countries.

BRIEF SUMMARY

In summary, one aspect provides an information handling device comprising: one or more processors; and one or memories storing program instructions accessible by the one or more processors; wherein, responsive to execution of program instructions stored in said one or more memories, the one or more processors are configured to: ascertain a resume request for resuming to a secondary operating environment; and prior to resuming said information handling device to said secondary operating environment, initiate a primary operating environment security application.

Another aspect provides a method comprising: ascertaining a resume request for resuming an information handling device to a secondary operating environment; and prior to resuming said information handling device to said secondary operating environment, initiating a primary operating environment security application.

A further aspect provides a computer program product comprising: a storage device having computer readable program code embodied therewith, the computer readable program code comprising: program code configured to ascertain a resume request for resuming an information handling device to a secondary operating environment; and program code configured to, prior to resuming said information handling device to said secondary operating environment, initiate a primary operating environment security application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Tablet and laptop computers each have their own set of advantages. Advantages for tablet computers include mobility, size, weight, and increased ease of use for certain functions, such as image manipulation. While primary reasons for preferring laptop computers are increased processing power and battery life, wider choice of operating systems and applications, and the presence of the standard/physical keyboard and touch input devices. As such, it would be advantageous to provide a form factor that includes the functionality and features of both a laptop computer and a tablet computer in one single information handling device.

Embodiments provide for a hybrid information handling device comprising a primary environment (PE) (for example, a Win-Tel platform) and a secondary environment (SE) (for example, a light weight/ANDROID platform) in a single unit. The hybrid device includes various features as described further herein. In and among other features, an embodiment provides efficient security credential handling for switching between operating environments while maintaining an ability to properly secure the information handling device.

The illustrated example embodiments will be best understood by reference to the figures. The following description is intended only by way of example, and simply illustrates certain example embodiments.

Figure 1:
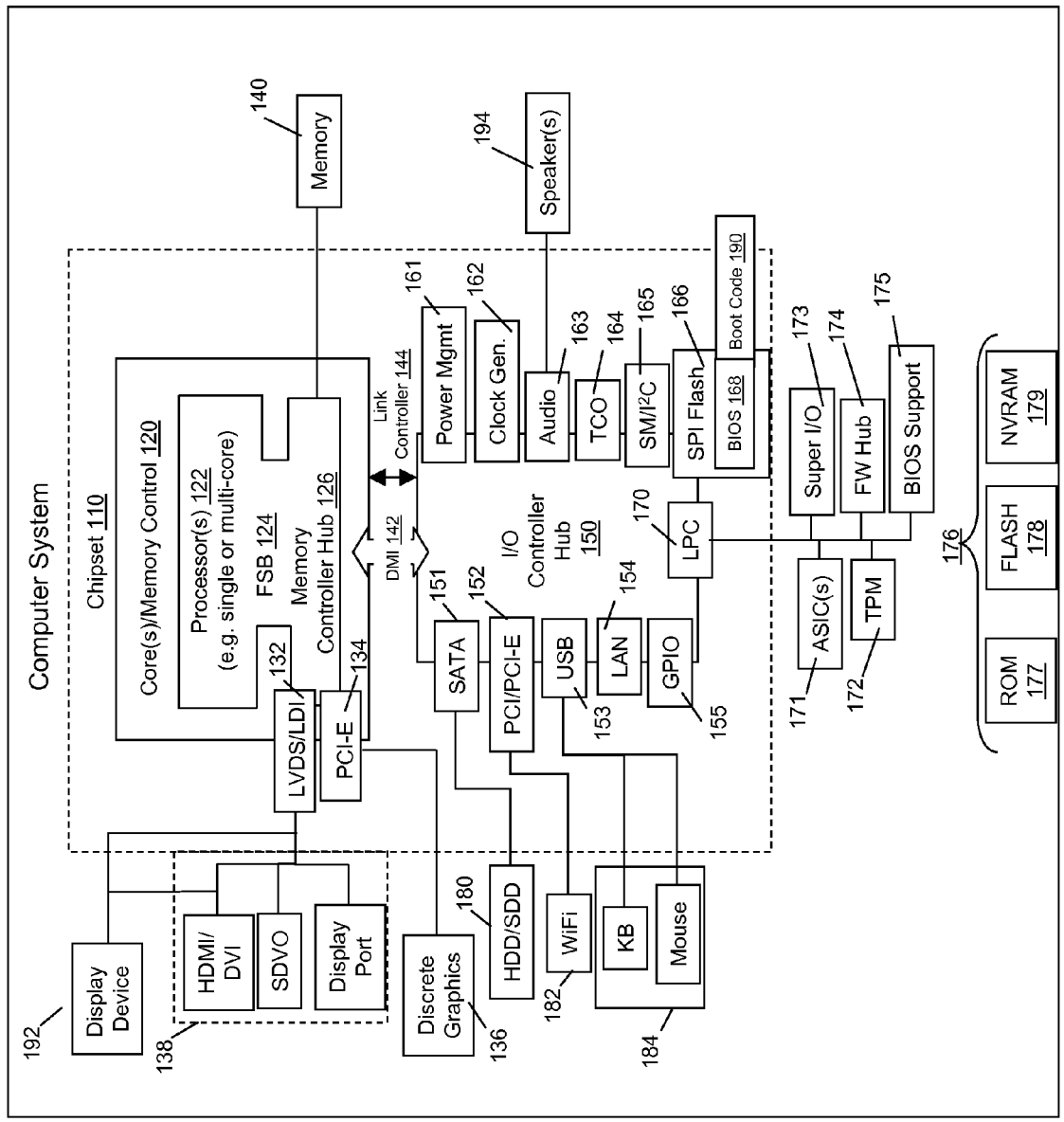
FIG. 1 illustrates example information handling device circuitry.

While various other circuits, circuitry or components may be utilized, FIG. 1 depicts a block diagram of one example of Win-Tel type information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, et cetera). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, a projector, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
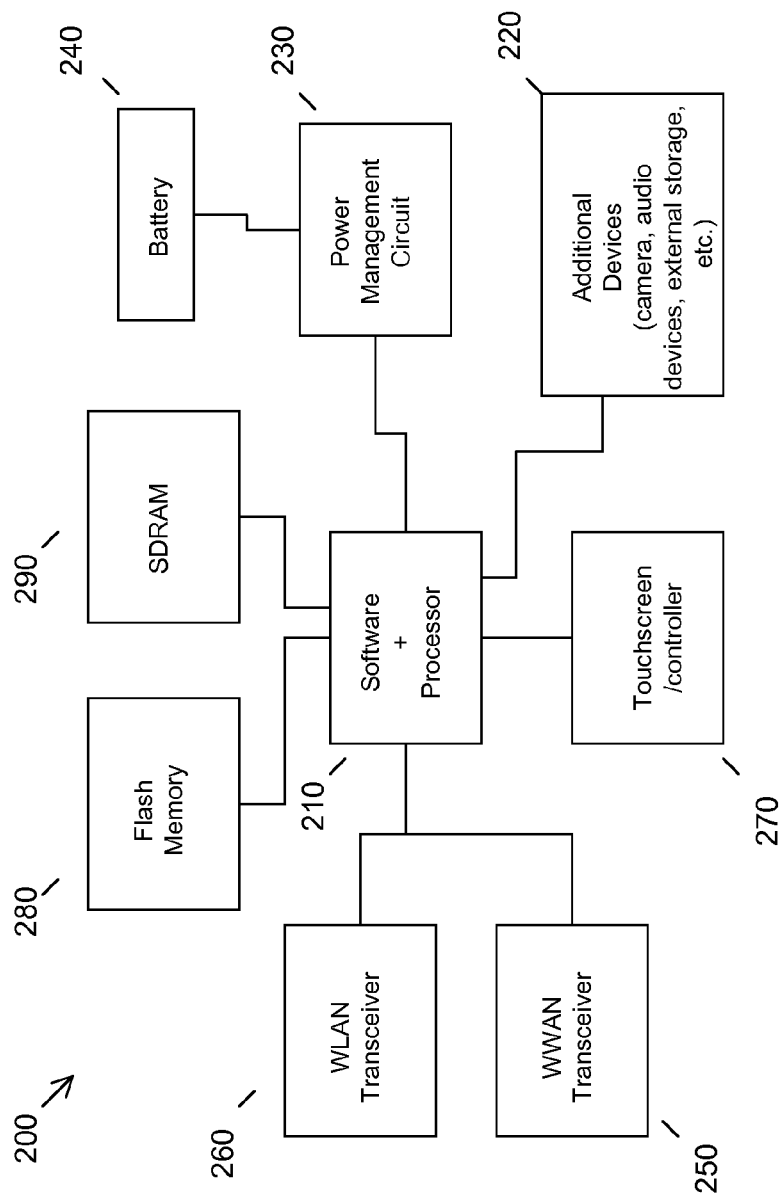
FIG. 2 illustrates example information handling device circuitry.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touchscreen 270 for data input and display. ARM based systems 200 also typically include various memory devices, for example flash memory 280 and SDRAM 290.

As described herein, embodiments combine components of FIG. 1 and FIG. 2 into a hybrid device. While various embodiments may take a variety of hybrid forms, FIG. 3 illustrates one example hybrid environment.

Figure 3:
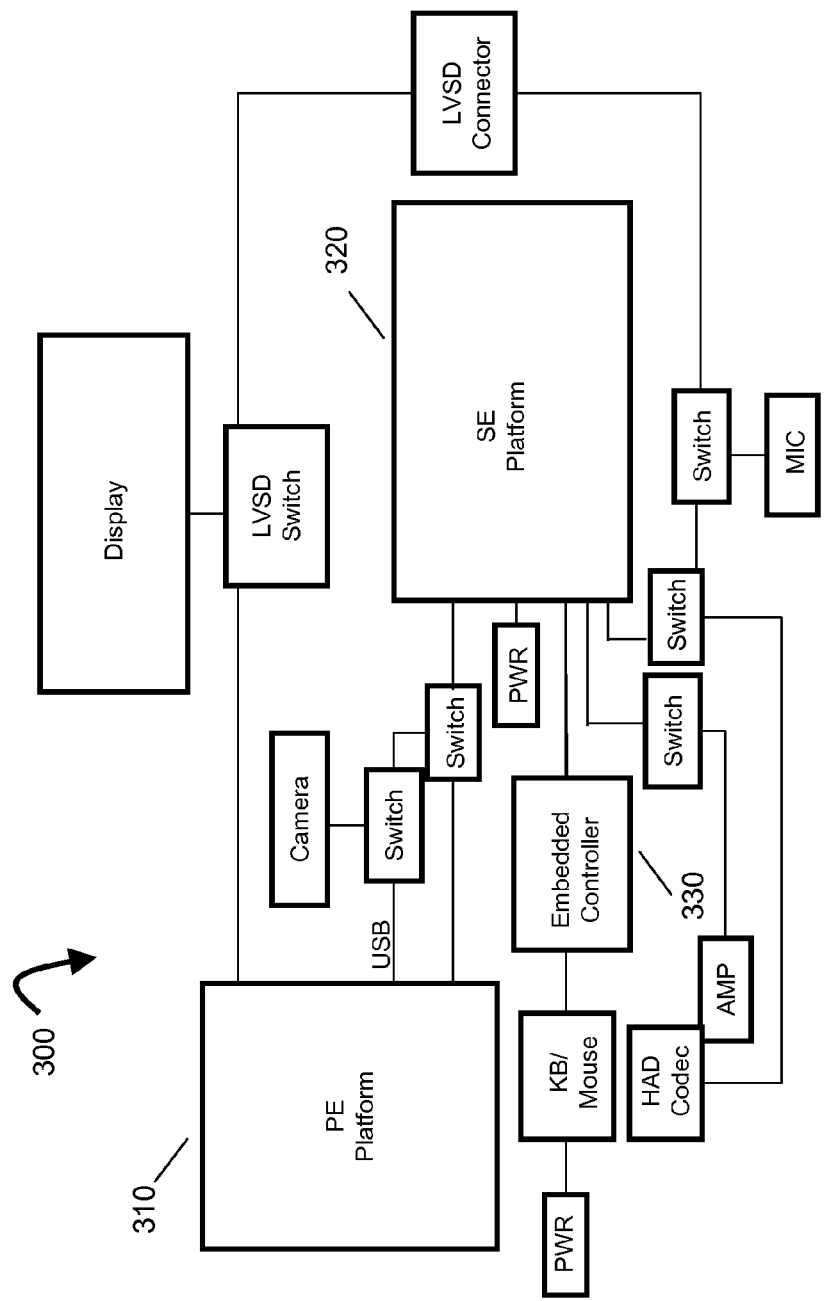
FIG. 3 illustrates an example hybrid information handling device environment.

FIG. 3 provides an illustration of an example embodiment of a hybrid information handling device 300 ("device"). The device 300 has at least two environments or states: a primary environment (PE) and a secondary environment (SE), supported by two platforms, 310 and 320, respectively. Thus, device 300 may include a PE platform 310 similar to that described in FIG. 1, and a SE platform 320 such as that described in FIG. 2. For example, an embodiment provides a PE in which a user experiences a WINDOWS operating environment or state, and a SE in which a user experiences an ANDROID operating environment or state. In a PE, the device 300 may thus operate according to a WINDOWS operating system. In a SE, the device 300 may operate according to an ANDROID operating system. According to an embodiment, a user may switch between these two states.

The device 300 may include a display and input interfaces (for example, keyboard, mouse, touch interface, et cetera). Switching electronics (switches in FIG. 3) permit the display, touch interface, camera, microphone and similar peripherals to be used by either the PE or SE platforms 310, 320, depending on which is the actual operating environment chosen by the user. Communications between PE platform 310 and the SE platform 320 may take place various levels. Control of machine-state, security and other related functions may be provided by an embedded controller 320 of the device 300. Communication links may use protocols like I2C or LPC.

Higher bandwidth communications, such as used to move large amounts of data, for example video files, may use methods like USB, PCI express or Ethernet.

When the device 300 is in the SE mode or state, the device 300 operates as an independent tablet computer. As such, the SE platform 320 and the lightweight/tablet operating system executed therewith, such as an ANDROID operating system, control the operation of the device 300, including the display, peripherals such as a camera, microphone, speaker, shared wireless antenna, accelerometer, SD card, other similar peripheral devices, and software applications.

The device 300 utilizes the PE platform 310 when the user selects such an operational state, and this operational state may be set as a default or an initial state. When in the PE state, the device 300 is controlled by a PE platform 310, including for example a WINDOWS operating system. Essentially, the device 300 becomes a conventional laptop computer when PE platform 310 controls operation. As such, the SE platform 320 does not control device 300, peripherals, et cetera, when the device 300 is in the PE state, though an ANDROID operating system of SE platform 320 may be running in the PE state, as further described herein.

In such a hybrid environment, there are thus essentially two computing systems within one device 300, that is a primary system (PE), and a secondary system (SE). These systems may share access to various hardware, software, peripheral devices, internal components, et cetera, depending on the state (PE or SE). Each system is capable of operating independently.

In coordinating the PE and SE in terms of controlling security elements, including, but not limited to, user login and authentication, one function of embodiments is to ensure adequate security for each of PE and SE. If PE and SE were running on separate physical devices, each system may have its own security mechanism. Thus, if separate security mechanisms were simply imported into a hybrid environment, a user would need to remember two sets of security credentials. A user could set the security to be the same for both PE and SE; however, a drawback is that if one of PE or SE security expires, the user must then remember to update both. A second approach would be to use the higher performance operating environment (PE) to store and pass the credentials to the SE. However, this adds a layer of complexity and may compromise security on the SE.

An embodiment thus provides for reusing existing security on the PE to secure the SE. This credential reuse may occur for example on power state transitions. The device 301 keeps track of what the state was (PE or SE) prior to power state transition (for example, entering suspended state) and will resume the user to that previous state after entering PE credentials for authentication. In a case where a user disables resume security in PE, the system may simply resume directly to the SE (without prompting for security). If a PE event (for example, transition from suspend to hibernate due to critical low battery) triggers what would cause a power state change while SE is active, an embodiment may briefly enter PE and then respond to the power event without waiting on a credential challenge.

In this description, the Advanced Configuration and Power Interface (ACPI) power states (S0-S5) are used herein to refer to both PE and SE power states simultaneously in a format defined herein where the first numeral in the format indicates power state of PE, and the second numeral indicates power state of SE. Thus, power state S03 indicates PE is in power state S0 (working), whereas SE is in power state S3 (standby/sleep).

Figure 4:
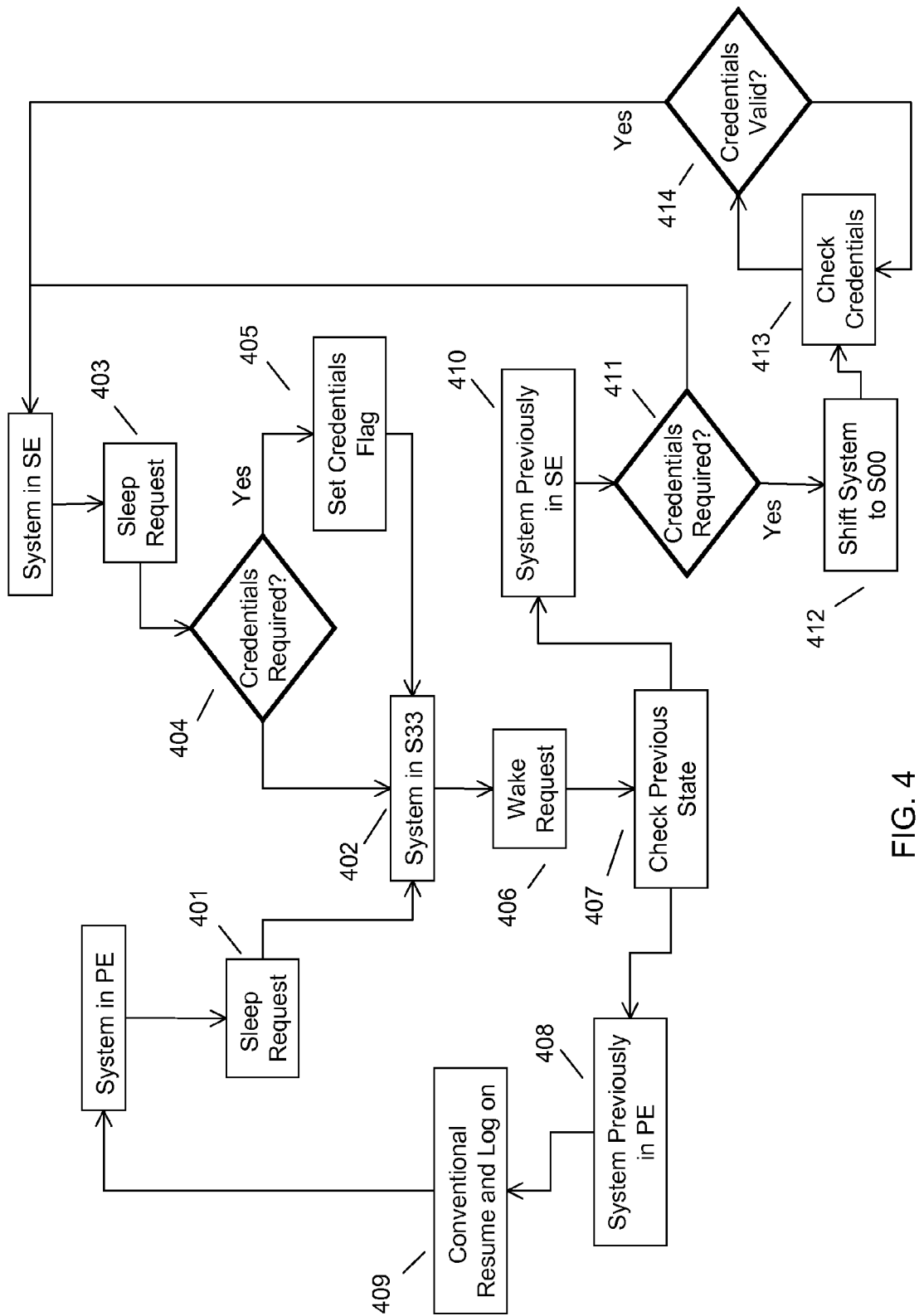
FIG. 4 illustrates an example of handling security credentials in a hybrid environment.

Referring to FIG. 4, an embodiment provides for security credential handling in a hybrid environment. An embodiment handles security credentials in the hybrid environment by essentially shifting the system state such that the PE security mechanism is invoked prior to allowing resume, irrespective of which state (PE or SE) was active prior to the system power down event (for example, suspend, sleep, hibernate, shut down, et cetera). An embodiment handles suspend/resume procedures (using a "sleep" request as an example power state change request) as follows. For a suspend/sleep request (user presses Fn-F4, or an inactivity timer expires), if the user is using PE 401, the PE enters a sleep state as it normally would 402. The embedded controller 330 may inform SE that PE has changed state. SE may then enter sleep state (system in S33—402).

If the user is using SE on a sleep request 403, the device 301 (for example, controller 330) determines if credentials are required (by a PE security application) at 404. If yes, a flag is set to indicate that PE requires security credentials 405 (for example, log on credentials). SE then enters sleep state 402. On a wake request, device 301 checks the previous state (that is controlled by PE or SE), which was ascertained by the controller 330 prior to entering sleep. If the system was previously in PE state (SOX, where X=0-5) 408, then the PE may continue its conventional resume 409 and log the user on using PE security application, if any security credential is indeed required. However, if at 407 it is determined that the device 301 was in SE operating state (for example, S30) 410, device determines if credentials are required at 411. For example, device 301 determines if credentials flag was set at 405. If not, then device 301 may resume directly to SE without requiring credentials.

However, if it is determined that credentials are required at 411, then device 301 shifts 412 operating environment into PE (for example, S00), such that a PE security application may check credentials and authenticate the user 413. For example, embedded controller 330 may signal to PE to wake such that a PE security application may run to validate a user's input credentials. If credentials are determined to be valid at 414 by PE security application, then device 301 may resume to SE without invoking any SE specific security application.

Thus, an embodiment provides that an embedded controller 330 remembers the environment, SE or PE, that was previously active. On a resume, for example when the user presses the Fn key or power button, if the user had previously been using SE, the embedded controller 330 signals SE and PE to wake up. The user sees the PE screen lock and enters PE password. The system then may switch to SE, and the user interacts with SE. Otherwise, if the user had previously been using PE, the embedded controller 330 signals SE and PE to wake up. The user interacts with PE as normal.

Figure 5:
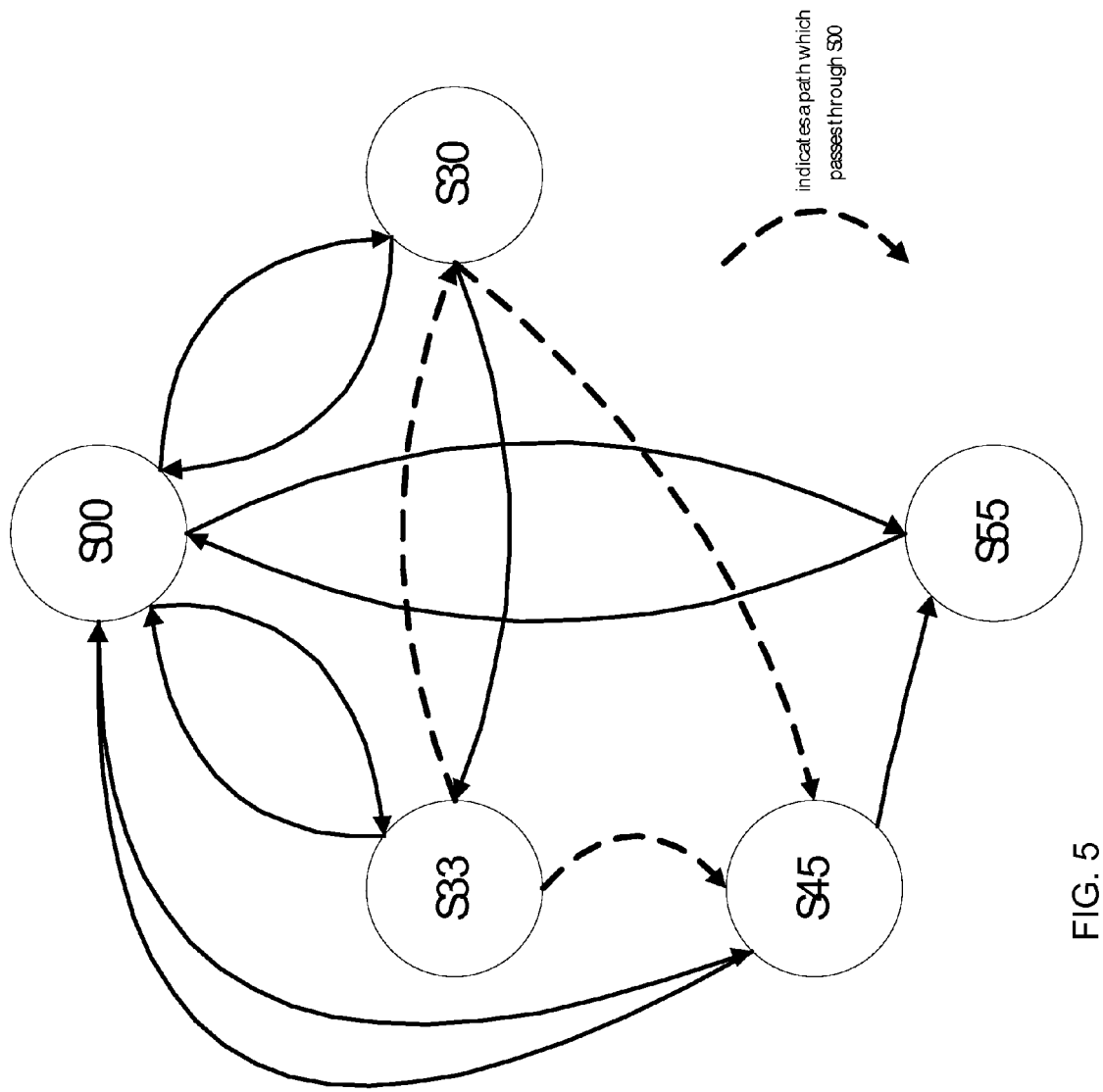
FIG. 5 illustrates an example state diagram for handling security credentials in a hybrid environment.

FIG. 5 illustrates an example state diagram indicating power states (in format S(PE) (SE), as described herein) for security credential handling. Essentially, as outlined in connection with FIG. 4, an embodiment provides a tracking mechanism such that a component (embedded controller(s) in the example of FIG. 4) remembers what state a user had the hybrid device 301 in prior to a power state transition. A component also tracks if a user would typically be required to enter a security credential (for example, password or biometric) to resume the device. Thus, on a resume, an embodiment may shift the device 301 to the appropriate state such that the security application(s) of the PE (for example, WINDOWS security applications) may be used, irrespective of the device state being resumed to (for example, SE).

Specifically in FIG. 5 are illustrated example power state transitions. Of note is state transition S33 to S30. For S33 to S30, each of PE and SE are in sleep state, and the user wishes to resume to operating in SE. If credentials are required for such a resume, the device must pass through PE security (and hence state S00). Table 1 indicates some example initial states, final states, triggers, and a brief note on processing for handling security credentials in a hybrid environment.

TABLE 1

| Initial State | Final State | Trigger(s) | Note |
| --- | --- | --- | --- |
| S00 | S33 | Start → Sleep<br>Fn-F4 Key<br>Inactivity Timer<br>Lid Switch | Embedded Controller sends notification to SE |
| S30 | S33 | Fn-F4 Key<br>Inactivity Timer<br>Lid Switch | Embedded Controller sends notification to SE |
| S30 | S45 | Critical Low Battery | PE is resumed, then PE hibernates and SE powers off |
| S30 | S00 or S30 | Fn-F4 Key<br>Power Button<br>Lid Switch<br>Fingerprint Swipe | Final State (S00 or S30) depends on path into S30. User Provides PE Credentials to unlock system System enters S30 after user has been granted access to S00 |
| S33 | S45 | Low Battery | For low battery event, system enters S45 via S00 |

Embodiments may be implemented in one or more information handling devices configured appropriately to execute program instructions consistent with the functionality of the embodiments as described herein. In this regard, FIGS. 1-3 illustrate non-limiting examples of such devices and components thereof. While mobile information handling devices such as tablet computers, laptop computers, and smartphones have been specifically mentioned as examples herein, embodiments may be implemented using other systems or devices as appropriate.

As will be appreciated by one skilled in the art, various aspects may be embodied as a system, method or computer (device) program product. Accordingly, aspects may take the form of an entirely hardware embodiment or an embodiment including software that may all generally be referred to herein as a "circuit," "module" or "system." Furthermore, aspects may take the form of a computer (device) program product embodied in one or more computer (device) readable medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device comprising:
   one or more processors; and
   one or memories storing program instructions accessible by the one or more processors;
   wherein, responsive to execution of program instructions stored in said one or more memories, the one or more processors are configured to:
   ascertain a resume request for resuming to a secondary operating environment; and
   prior to resuming said information handling device to said secondary operating environment, initiate a primary operating environment security application.

2. The information handling device of claim 1, wherein to initiate a primary operating environment security application includes shifting said information handling device to an active power state for said primary operating environment.

3. The information handling device of claim 1, wherein, responsive to execution of program instructions stored in said one or more memories, the one or more processors are further configured to indicate that security credentials are required for resuming to said secondary operating environment.

4. The information handling device of claim 3, wherein, responsive to execution of program instructions stored in said one or more memories, the one or more processors are further configured to ascertain if security credentials are required by checking a security indicator prior to resuming said information handling device to said secondary operating environment.

5. The information handling device according to claim 4, wherein, responsive to execution of program instructions stored in said one or more memories, the one or more processors are further configured to check security credentials prior to resuming said information handling device to said secondary operating environment.

6. The information handling device according to claim 5, wherein said security credentials are utilized for both the primary operating environment and the secondary operating environment.

7. The information handling device of claim 1, wherein said primary operating environment is implemented on a primary environment platform.

8. The information handling device of claim 1, wherein said secondary operating environment is implemented on a secondary environment platform.

9. The information handling device of claim 8, wherein the secondary environment platform comprises a system on chip architecture.

10. A method comprising:
ascertaining a resume request for resuming an information handling device to a secondary operating environment; and
prior to resuming said information handling device to said secondary operating environment, initiating a primary operating environment security application.

11. The method of claim 10, wherein said initiating a primary operating environment security application includes shifting said information handling device to an active power state for said primary operating environment.

12. The method of claim 10, further comprising indicating that security credentials are required for resuming to said secondary operating environment.

13. The method of claim 12, further comprising ascertaining if security credentials are required by checking a security indicator prior to resuming said information handling device to said secondary operating environment.

14. The method of claim 13, further comprising checking security credentials prior to resuming said information handling device to said secondary operating environment.

15. The method of claim 10, further comprising setting an indicator to indicate an operating environment prior to entering a suspend state from an active state.

16. The method of claim 15, further comprising ascertaining the operating environment prior to resuming said information handling device to an active state via checking said indicator.

17. The method of claim 16, further comprising ascertaining said operating environment indicated by said indicator is a secondary operating environment.

18. The method of claim 17, further comprising requiring credentials responsive to determining said indicator indicates said secondary operating environment.

19. A computer program product comprising:
a storage device having computer readable program code embodied therewith, the computer readable program code comprising:
program code configured to ascertain a resume request for resuming an information handling device to a secondary operating environment; and
program code configured to, prior to resuming said information handling device to said secondary operating environment, initiate a primary operating environment security application.

20. The computer program product of claim 19, wherein to initiate a primary operating environment security application includes shifting said information handling device to an active power state for said primary operating environment.

* * * * *